June 30, 1964   M. C. PARKINSON ETAL   3,138,937
METHOD OF PRODUCING A GAS-TIGHT SEAL BETWEEN A PAIR OF
ADJACENT SECTIONS OF A FREEZE-DRYING CONTAINER
Original Filed March 10, 1961

INVENTORS:
MARTIN C. PARKINSON
CHARLES E. BENDER

By  J. Walton Bader

ATTY.

United States Patent Office

3,138,937
Patented June 30, 1964

3,138,937
METHOD OF PRODUCING A GAS-TIGHT SEAL BETWEEN A PAIR OF ADJACENT SECTIONS OF A FREEZE-DRYING CONTAINER
Martin C. Parkinson, Poughkeepsie, and Charles E. Bender, New Paltz, N.Y., assignors to The Virtis Company, Inc., Gardner, N.Y., a corporation of New York
Original application Mar. 10, 1961, Ser. No. 94,848, now Patent No. 3,080,990, dated Mar. 12, 1963. Divided and this application Jan. 21, 1963, Ser. No. 252,897
3 Claims. (Cl. 62—100)

This invention relates to a method of producing a gas-tight seal between a pair of adjacent sections of freeze-drying flasks utilized in the drying of biological materials, and more particularly to such flasks designed for use under high vacuums, of the order of 1 micron.

This is a divisional application of our copending application, Serial No. 94,848, filed March 10, 1961.

In the preservation of biological substances for further use, it is necessary to uniformly dry the substances as completely as possible without introducing changes in their physical structure or alteration of the chemical reactivity thereof. One of the most important methods for accomplishing such drying involves the utilization of freeze-drying apparatus in which the material to be dried is frozen and maintained at very low temperatures, of the order of —80° C., and then subjected to regulated amounts of heat under high vacuums, in order to sublimate the ice present, while the frozen mass is maintained at temperatures well below its freezing point.

Freeze-drying flasks heretofore used have entailed the bothersome manipulation of conventional ground glass joints which must be carefully lubricated and fitted together in the assembly of the freeze-drying apparatus. Joints of glass against glass are objectionable not only because of the expense involved in making a gas-tight ground glass joint but also because they tend to fail under high vacuum.

Other objects and advantages of the present invention will be apparent from the following detailed description thereof.

In the accompanying drawing forming a part of this specification and showing, for purposes of exemplification, a preferred form of this invention, without limiting the claimed invention to such illustrative form:

Figure 1:
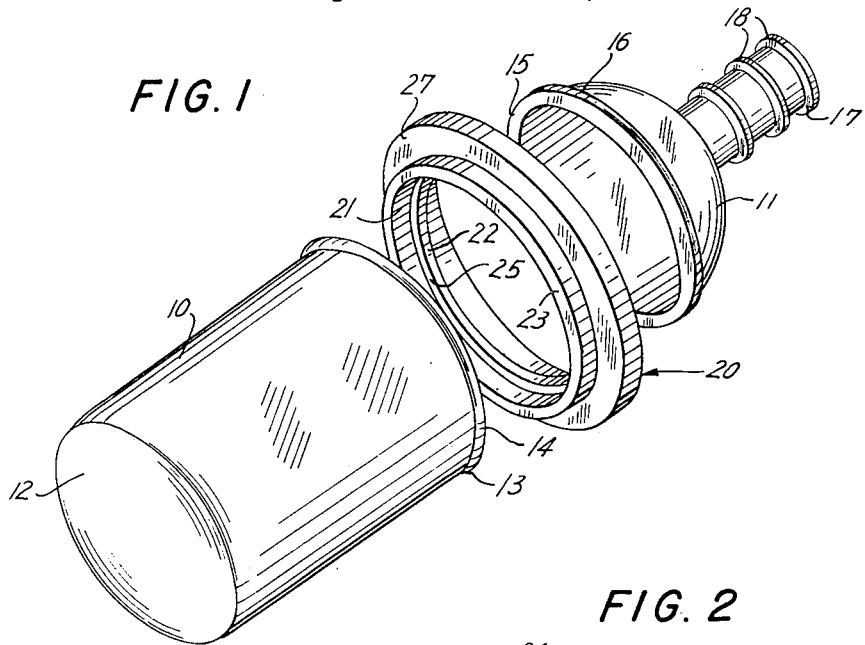
FIGURE 1 is a perspective view of a freeze-drying flask utilizing the method of the invention, with the parts shown in disassembled positions.
Figure 2:
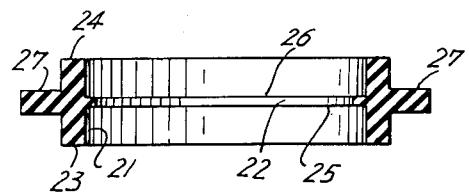
FIGURE 2 is a vertical section through the sealing member joining the flask sections of FIGURE 1.

In FIGURE 1, a pair of flask sections 10 and 11 are shown, each of which is desirably formed of a temperature stable glass or plastic material. The lower flask section 10, which is generally cylindrical in shape, is permanently closed at one end 12 and is provided with a circular rim 13 at the opposite end, the rim having a smoothly bevelled outer periphery or lip 14.

The upper flask section 11, which is generally hemispherical in shape, has at its base, a circular rim 15 of the same circumference as the rim 13, which rim 15 is provided with a smoothly bevelled outer periphery or lip 16. At the pole end of the hemispherical upper flask section 11 a tubular outlet 17 is located for connection to a vacuum pump or other suitable vacuum source. A number of rings 18 are provided on the tubular outlet 17 insuring a tight engagement with a suitable connector leading to the source of the vacuum.

The upper and lower flask sections are joined by a sealing member 20 composed of an elastomeric material which is resistant to the low temperatures, of the order of —80° C., produced upon evacuating the flask and freezing its contents. The elastomeric material is one which retains its elasticity and thus insures a gas-tight seal at the temperatures at which the vacuum drying is performed. Preferably, sealing member 20 is made of a silicone rubber elastomer having a durometer of from 40 to 80, and most desirably a durometer of about 50. Such silicone rubbers are formed by milling methylpolysiloxanes with appropriate fillers, such as silica, titania, zinc oxide or iron oxide, and with a curing agent such as benzoyl peroxide, 2,4-dichloro benzoyl peroxide, or other organic peroxides. The methylpolysiloxanes are prepared by hydrolyzing chlorosilanes such as methyl trichlorosilane, dimethyl dichlorosilane, or methylphenyl dichlorosilane, and bodying the resin dispersions to produce the corresponding polysiloxanes. The silicone rubber sealing member, preferably, is composed of a dimethylpolysiloxane containing composition, i.e. a dimethylpolysiloxane plus the usual filler. Such compositions are produced by polymerizing dimethyl dichlorosilane. For example, the commercial product sold by Union Carbide Corporation under its trade designation KW–1300 Silicone Rubber Masterbatch can be used as the base. To this base is added known curing agents, e.g. 2,4-dichloro benzoyl peroxide and a filler, and the resultant mixture cured in a conventional manner to produce the silicone sealing member.

The elastomeric sealing member 20 consists essentially of a cylindrical housing 21 having a thin inner flange 22 approximately midway between the end faces 23 and 24 of the housing. The inner flange 22 has an internal diameter approximately equal to the internal diameters of the rims 13 and 15 of the lower and upper flask sections, respectively, and includes opposed faces 25 and 26 for seating the respective rims thereon. The sealing member additionally includes an outer flange 27 positioned approximately midway between the ends 23 and 24 of the housing 21. The outer flange 27 has a substantially greater thickness than the inner flange 22, and is positioned directly opposite the inner flange symmetrically thereof in order to reinforce the side walls of the housing 21 in the regions adjacent the inner flange 22. Desirably, the side walls of the housing 21 have a length of from 3/8 to 1½ inches between the end faces 23 and 24, the inner flange 22 has a thickness of from 1/32 to 3/32 inches between its opposed faces 25 and 26 and the outer flange 27 has a thickness of from 3/32 to 9/16 inches, measured along the length of the side walls of the housing. These dimensions insure the maintenance of a secure gas-tight seal between the flask sections 10 and 11, as pointed out below.

Figure 3:
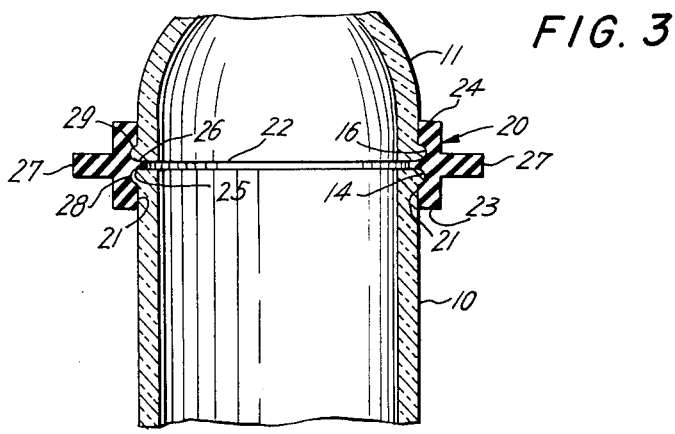
FIGURE 3 is a partially cut-away vertical section through the joint produced between the assembled flask sections and the sealing member.

As shown in FIGURE 3, the rims of the flask sections 10 and 11 engage the opposed faces 25 and 26 of the inner flange 22 of the sealing member 20 with the bevelled outer lips 14 and 16 pressing against the inner flange and the adjacent side walls of the housing 21. The pressure of the rim lips on the sealing member compresses the elastomeric material thereof and forms annular indentations 28 and 29 in the housing 21 of the sealing member in which indentations the rims 13 and 15 are seated, thus forming a gas-tight seal. The outer flange 27 serves to prevent bulging or rupturing of the sealing member by the compressive forces created by the seated rims and additionally facilitates application of the sealing member to the flask sections and removal therefrom.

Upon exhaustion of the air through the tubular outlet 17 in the upper flask section 11, the assembled flask sections become even more tightly sealed together, and vacuums of the order of 1 micron or lower may be safely produced therein. It is believed that the inner flange 22 and the side walls of the cylindrical housing 21 composed of the elastomer having a durometer of from 40 to 80 actually flow over the edges of the rims 13 and 15 of the flask sections as the vacuum is applied, and thereby provide an extremely tight seal between the parts of the freeze-drying flask. It will be understood that the above explanation is intended as illustrative and not limiting of the mode of operation of the freeze-drying flask of this invention.

Thus, the present invention provides a freeze-drying flask which is simply constructed, easily handled, and evacuated with a minimum of manipulative effort to obtain vacuums of the order of 1 micron.

Since different embodiments of the invention may be made without departing from the scope thereof, it is intended that all matter contained in the above description or shown in the accompanying drawing shall be interpreted as illustrative and not in a limiting sense.

What is claimed is:

1. A method of producing a gas tight seal between a pair of adjacent sections of a freeze drying container while said container is utilized in connection with a process of freeze drying, comprising the steps of preparing a container having a pair of opposable hollow sections, placing a sealing member formed of a silicone rubber having a durometer of from 40 to 80 between said sections while said container is at room temperature and atmospheric pressure, placing said container in operative relationship with a source of vacuum and of low temperature, evacuating the air from said container and lowering the temperature to produce a temperature of at least −70° C. and a vacuum of at least one micron, whereby the sealing member flows over the opposed edges of the container sections.

2. A method of producing a gas tight seal between a pair of adjacent sections of a freeze drying container while said container is utilized in connection with a process of freeze drying, comprising the steps of preparing a container having a pair of opposable hollow sections, placing a sealing member formed of elastomeric material having a durometer of from 40 to 80 between said sections while said container is at room temperature and atmospheric pressure, placing said container in operative relationship with a source of vacuum and of low temperature, evacuating the air from said container and lowering the temperature to produce a temperature of at least −70° C. and a vacuum of at least one micron, whereby the sealing member flows over the opposed edges of the container sections.

3. A method of producing a gas tight seal between a pair of adjacent sections of a freeze drying container while said container is utilized in connection with a process of freeze drying, comprising the steps of preparing a container having a pair of opposable hollow sections, one of said sections being hemispherical in shape and carrying a conduit member the other of said sections being jar shaped, placing a sealing member formed of a silicone rubber having a durometer of from 40 to 80 between said sections while said container is at room temperature, connecting said conduit to a source of vacuum and placing said container adjacent to a source of low temperature, evacuating the air from said container and lowering the temperature to produce a vacuum of at least one micron and a temperature of at least −70° C., whereby the sealing member flows over the opposed edges of the container sections.

References Cited in the file of this patent

UNITED STATES PATENTS

| Re. 20,969 | Reichel | Jan. 3, 1939 |
| 2,853,796 | Sanders | Sept. 30, 1958 |
| 2,953,543 | Pike | Sept. 20, 1960 |
| 2,979,479 | Modic | Apr. 11, 1961 |

OTHER REFERENCES

"Silicones" by R. N. Meals and F. M. Lewis; published by Reinhold Publishing Corporation, New York, New York, copyright 1959.